United States Patent
Balakrishnan et al.

(10) Patent No.: US 7,725,122 B1
(45) Date of Patent: May 25, 2010

(54) METHOD AND SYSTEM FOR CONTROLLING SECTOR SWITCHING

(75) Inventors: Swaminathan Balakrishnan, Overland Park, KS (US); Jason Sigg, Olathe, KS (US); Ajay Manghat, Overland Park, KS (US); Ashish Bhan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 626 days.

(21) Appl. No.: 11/786,195

(22) Filed: Apr. 11, 2007

(51) Int. Cl.
*H04Q 7/20* (2006.01)

(52) U.S. Cl. .................. 455/522; 455/432.1; 455/422.1; 455/436; 455/414.1; 455/426.1; 370/331; 370/332; 370/337; 370/338; 370/328

(58) Field of Classification Search .................. 455/522, 455/69.5, 517, 436–444, 432.1, 432.2, 432.3, 455/67.11, 422.1, 403, 414.1–414.4, 426.1, 455/426.2, 550.1, 512, 513, 515, 516, 524; 370/310, 328, 329, 331, 332, 337, 338, 343, 370/347

See application file for complete search history.

(56) References Cited

U.S. PATENT DOCUMENTS

| 7,302,271 | B2 * | 11/2007 | Kalhan et al. ............ 455/456.1 |
| 2004/0102194 | A1 * | 5/2004 | Naghian et al. ............ 455/436 |
| 2005/0164709 | A1 * | 7/2005 | Balasubramanian et al. 455/453 |

OTHER PUBLICATIONS

3rd Generation Partnership Project 2—3GPP2 cdma2000 High Rate Packet Data Air Interface Specification, Version 4.0, Oct. 2002.

* cited by examiner

*Primary Examiner*—Keith T Ferguson (57) ABSTRACT

A method and system for controlling switching of an access terminals between wireless coverage areas such as cell sectors. A measure of actual level of service, such as throughput, provided to the access terminal across the combination of wireless coverage areas over time is determined. Further, for each wireless coverage area, a measure of predicted level of service, such as throughput, that would likely be provided to the access terminal if it operated in just that wireless coverage area is determined. If the actual level of service is greater than each predicted level of service, then the access terminal is allowed to continue switching between wireless coverage areas. On the other hand, if at least one of the predicted levels of service is greater than the actual level of service, then the access terminal is restricted to the wireless coverage area where the level of service is deemed greater.

18 Claims, 5 Drawing Sheets

*Figure 4A : Typical Behavior (w/out invention)*

| Time slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Sector 1 | 307 | 307 | 307 | | | | | | | | | | | | | | | | | | | | | 921 | 921 | 921 | 921 | 921 | 307 | 307 | 307 | 307 | | | | | | | | | | | | | | | | | | | | 307 | 307 | 307 | |
| Sector 2 | | | | | | | | | | | 614 | 614 | 614 | 614 | 614 | 614 | | | | | | | | | | | | | | | | | | | | | 614 | 614 | 614 | 614 | 153 | 153 | 153 | 153 | 153 | | | | | | | | | | |
| Null DRC | | | | | Null | Null | Null | Null | | | | | | | | | | | | | | | | | | | | | | | | | Null | Null | Null | Null | | | | | | | | | | | Null | Null | Null | Null | | | | | |

*Figure 4B : Post Invention Behavior (with invention)*

| Time slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Sector 1 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 921 | 921 | 921 | 921 | 921 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 |
| Sector 2 | | | | | | | | | | | 614 | 614 | 614 | 614 | 614 | 614 | | | | | | | | | | | | | | | | | | | | | 614 | 614 | 614 | 614 | 153 | 153 | 153 | 153 | 153 | | | | | | | | | | |
| Null DRC | | | | | | | | | | | | | | | | | | | | | | | | | | | | | | | | | | | | | | | | | | | | | | | | | Null | Null | Null | Null | | | |

*Figure 4C : Alternative Typical Behavior (w/ invention)*

| Time slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Sector 1 | 307 | 307 | 307 | 307 | 307 | 307 | 307 | 307 | | | | | | | | | | | | | | | | 921 | 921 | 921 | 921 | 921 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 | 307 |
| Sector 2 | | | | | | | | | | | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 614 | 153 | 153 | 153 | 153 | 153 | | | | | | | | | | |
| Null DRC | | | | | | | | | Null | Null | Null | Null | | | | | | | | | | | | | | | | | | | | | | | | | | | | | | | | | | | | Null | Null | Null | Null | | | | |

FIG. 5

METHOD AND SYSTEM FOR CONTROLLING SECTOR SWITCHING

FIELD OF THE INVENTION

The present invention relates to wireless communications and, more particularly, to handoff control in a wireless communication system.

BACKGROUND

In a typical cellular radio communication system, an area is divided geographically into a number of wireless coverage areas such as cells and cell sectors, each defined by a radiation pattern from one or more base station antennae. As an access terminal moves between coverage areas, such as sectors, of a cellular radio communication system, or when network conditions change or for other reasons, the access terminal may "hand off" from operating in one coverage area to operating in another coverage area. In a usual case, this handoff process is triggered by the access terminal monitoring the signal strength of signals that it is receiving in various available coverage areas, and the access terminal or a radio network controller (RNC) determining when one or more threshold criteria are met.

In some systems, for instance, the access terminal may monitor signal strength in various available coverage areas and notify the RNC when a given coverage area has a signal strength that is sufficiently higher than the coverage area in which the access terminal is currently operating. The RNC may then direct the access terminal to hand off to that other coverage area. In other systems, for instance, the access terminal may monitor the signal-to-noise ratio in various available coverage areas and periodically notify the RNC which coverage area has the best signal-to-noise ratio and may thus offer the best service. The RNC may then effect a handoff to the designated coverage area by sending communications to the access terminal in that coverage area.

While this arrangement generally works well to facilitate seamless coverage as an access terminal moves between wireless coverage areas, a problem can arise when an access terminal is operating in or near a border area between coverage areas. When an access terminal operates in such an area, the access terminal may experience rapidly changing air interface conditions in the adjacent coverage areas, which may cause the access terminal to hand off back and forth between the coverage areas. For instance, when operating in the area of overlap between two sectors A and B and currently being served by sector A, the access terminal may detect that the signal-to-noise ratio in sector B is better and may thus hand off to sector B. But shortly after doing so, the access terminal may then detect that the signal-to-noise ratio in sector A is better and may thus hand off back to sector A.

This "ping-ponging" between sectors can be inefficient, since each handoff process may consume valuable system resources and delay communications to the access terminal. As a specific example, when an access terminal operating under the 1x Evolution-Data Optimized protocol (EV-DO or 1xEV-DO) seeks to switch to a new sector, switching sectors may cause delay in data transmission between the network and the access terminal that impacts throughput, as a backhaul connection (i.e., a connection carrying data to another connecting network, such as the Internet for instance) is established with the new sector, and as other network resources are put in place to serve the access terminal in the new sector. In addition, a network scheduler, which handles requests from access terminals and allocates network resources according to those requests, may create additional delay, depending on its treatment of a request from an access terminal that is switching sectors. In particular, additional delay may arise as the RNC waits to have sufficient data in its buffer to send to the access terminal in a next time slot. Consequently, an improvement is desired.

SUMMARY

The present invention provides a mechanism to help manage handoffs of access terminals between wireless coverage areas. In a preferred embodiment, the invention can be applied with respect to access terminals that are largely stationary but have been experiencing a threshold high frequency of switching between wireless coverage areas. At issue for such an access terminal is whether the access terminal should be allowed to continue switching between wireless coverage areas or whether the access terminal should be restricted to operate in a given one of the wireless coverage areas (at least for the time being).

As presently contemplated, the RNC or another network entity serving the access terminal will programmatically determine whether to allow the access terminal to continue switching between wireless coverage areas by determining whether the access terminal is likely to receive better service by discontinuing the switching.

More particularly, a network entity determines (i) an actual level of service provided to the access terminal over the course of time that the access terminal has been switching between the wireless coverage areas and (ii) for each wireless coverage area respectively, a predicted level of service that is likely to be provided to the access terminal if the access terminal stays with that wireless coverage area. The network entity may then compare the actual level of service with the predicted level of service for each wireless coverage area. If the network entity thereby determines that the actual level of service is better than each predicted level of service, then the network entity may allow the access terminal to continue switching between the wireless coverage areas. On the other hand, if the network entity determines that the predicted level of service of the current wireless coverage area is better than the actual level of service, then the network entity may block the access terminal from switching between the wireless coverage areas and would preferably lock the access terminal into staying with the wireless coverage area that is likely to provide the best.

Also disclosed herein is a machine that is operable in a radio access network to control switching of an access terminal between wireless coverage areas in a wireless communication system. The machine comprises (a) a first interface for receiving data destined to the access terminal, (b) a second interface for transmitting the data to the access terminal via one or more base transceiver stations, (c) comparison logic for making a comparison of (i) an actual level of service provided to the access terminal over time while the access terminal has been switching between the wireless coverage areas, and (ii) for each of the wireless coverage areas, a predicted level of service that would be provided to the access terminal if the access terminal would operate in only that wireless coverage area, and (d) preclusion logic for precluding the access terminal from continuing to switch between the wireless coverage areas if the comparison indicates that the actual level of service is less than at least one of the predicted levels of service.

BRIEF DESCRIPTION OF THE DRAWINGS

An exemplary embodiment of the present invention is described herein with reference to the drawings, in which.

DETAILED DESCRIPTION

I. Wireless Network Architecture

Figure 1:
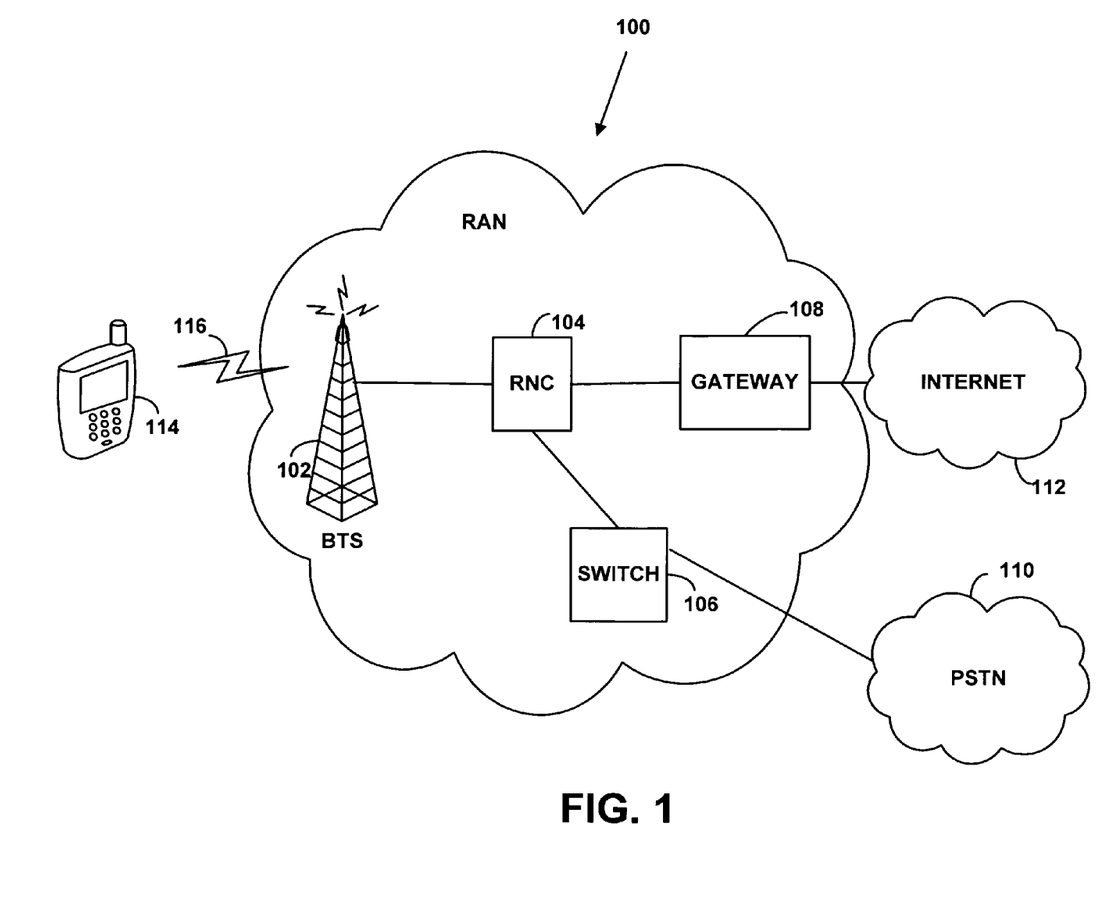
FIG. 1 is a simplified block diagram depicting a wireless communication system in which an exemplary embodiment can be employed.

A wireless communication system may include one or many subsystems that operate to provide service to access terminals. FIG. 1 depicts an exemplary wireless communication system including a radio access network (RAN) 100. Such a wireless communication system may be a part of a larger wireless communication system (which, for example, may include multiple interconnected RANs). In a RAN, such as RAN 100, a wireless carrier can implement numerous base transceiver station (BTS) towers 102, which helps to provide contiguous coverage for wireless subscribers. Each BTS 102 can be configured to define a respective cell site, as well as number of cell sectors. Groups of BTS towers in a given region will then typically be connected with a radio network controller (RNC) 104 (also known as a base station controller (BSC)), and the RNC may then connect with a switch 106 (e.g., a radio network controller (RNC), also referred to as a mobile switching center (MSC)) or gateway 108 (e.g., a packet-data serving node (PDSN)) that provides connectivity with a transport network such as the public switched telephone network (PSTN) 110 or the Internet 112 for instance.

With this arrangement, when an access terminal 114 (such as a cellular telephone or wirelessly-equipped portable computer or personal digital assistant, for instance) is positioned in a sector, the access terminal 114 may communicate via an RF air interface 116 with the serving BTS 102. Consequently, a communication path can be established between the access terminal 114 and a transport network via air interface 116, BTS 102, RNC 104 and switch 106 or gateway 108.

At times, an access terminal 114 engaged in a communication session may be largely stationary, staying within a single cell or sector while engaged in the communication session. However, an access terminal 114 may also move throughout a coverage area (e.g. move between cells and/or sectors) during a communication session. Accordingly, a wireless communication system may employ a mobile location system (MLS) for locating access terminals.

Figure 2:
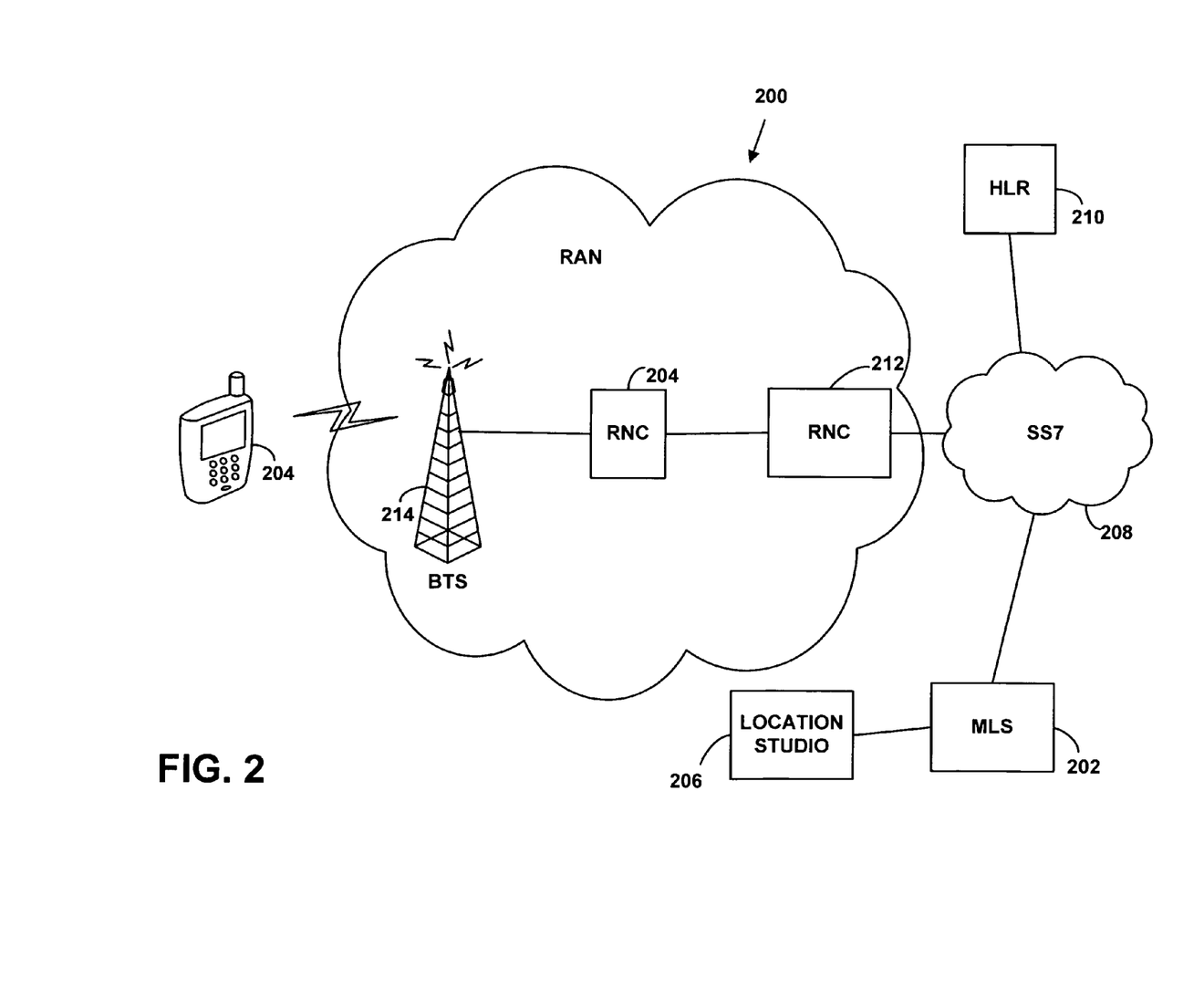
FIG. 2 is another simplified block diagram depicting a wireless communication system in which an exemplary embodiment can be employed.

FIG. 2 is a block diagram depicting a wireless communication system including a RAN 200, that is similar to the system depicted in FIG. 1. However, FIG. 2 includes an MLS 202, among other possible differences. MLS 202 is arranged to determine and report access terminal locations, such as the location of access terminal 204, to requesting entities. As a general matter, MLS 202 may learn the position of an access terminal at issue by communicating with the access terminal itself and/or with various other entities such as the RAN 200 currently serving the access terminal 204.

Further, the carrier may operate a front end location studio 206 for interfacing between location-based service applications and MLS 202. When location studio 206 receives a location request from an location-based service application, front end location studio 206 may send a corresponding location request to MLS 202, and the MLS may, in turn, determine the location of the access terminal. MLS 202 may then return the determined location of the access terminal to location studio 206, and the location studio may then return to the location-based service application the determined location or data derived from the determined location (such as mapping, routing, or street address information, for instance).

The MLS 202 may learn the location of an access terminal using various techniques. For example, the MLS may send a location request to the RAN that is currently serving the access terminal, and the RAN may respond with an indication of the cell/sector in which the access terminal is currently operating. For example, this communication may occur through a signaling network such as a Signaling System #7 (SS7) network 208, after a home location register (HLR) 210 informs MLS 202 which radio network controller (RNC) 212 is currently serving the access terminal 204.

Alternatively or additionally, MLS 202 may engage in communication with access terminal 204 to obtain an indication of the access terminal's location. More particularly, MLS 202 may ask the access terminal to report its location, and the access terminal may responsively compute its location with a global positioning system (GPS), using satellite-based positioning data. The access terminal then returns the satellite-based positioning data, or a location determined using the satellite-based positioning data, to the MLS. If the access terminal provides the raw satellite-based positioning data, MLS 202 can use the data to compute the access terminal's location. Alternatively, the MLS may use various triangulation techniques that are now known (e.g., advanced forward-link trilateration (AFLT)) or still to be discovered, to locate or assist in locating the access terminal 204. In either case, the communication between the MLS and the access terminal can occur in various ways, such as through a data session between the MLS and the access terminal (also known as "user plane" communication), or through control channel (e.g., SS7) signaling between MLS 202 and the access terminal 204 via BTS 214, RNC 212, and SS7 network 208.

It should be understood that the invention can be applied in numerous types of wireless communication systems, largely regardless of the type of system. Thus, for instance, the invention can be applied in systems operating according to the well known CDMA, TDMA, GSM, Wi-Fi, and/or WiMax protocols, or according to other protocols now known or later developed. As presently contemplated, however, the invention is particularly useful in a system that operates according to a time-division-multiplex protocol, such as 1xEV-DO (as defined by the well known IS-856 recommendation).

II. EV-DO Communications and Handoffs Used in Exemplary Embodiments

In a system employing EV-DO, communications on at least the forward link (i.e., communications directed from a RAN to access terminals) are divided into time slots, and the network sends bearer data to just one access terminal per time slot, using the full sector transmission power. This arrangement results in improved transmission of data bursts (e.g., multiple packets of data) to the access terminal. In EV-DO, the RNC or another network entity (such as the BTS) applies a scheduling algorithm to determine which access terminal a sector should serve in each time slot and further to determine the rate at which to transmit data to the served access terminal in the time slot. It should be understood that in later versions of EV-DO, multi-user timeslots are contemplated. The present invention can apply in those later versions as well.

In practice, each access terminal monitors pilot signals that it receives on various sectors and computes a signal-to-noise ratio (C/I) for each sector. On a per time slot basis, the access terminal then selects the sector that provides the best (highest) signal-to-noise ratio and further determines (e.g., through a simple table lookup) a data rate corresponding with that signal-to-noise ratio. The access terminal then sends on a reverse link "Data Rate Control" (DRC) channel to the RNC, a "DRC request" that includes (i) a "DRC cover," which is an indication of the sector in which the access terminal would like to operate and (ii) an indication of the data rate requested by the access terminal. In EVDO, the indication of the data rate is a DRC Rate, which is a fixed value ranging from 1 to 12. Each value represents a different data rate. For example, a DRC rate=1 indicates a data rate of 38.4 kbps. If the RNC has data to transmit to the access terminal, and if the RNC scheduling algorithm permits, the RNC will then transmit the data to the access terminal at the requested data rate.

EV-DO defines a "DRC length" parameter, which specifies the number of time slots an access terminal must wait before changing its DRC request (including its DRC cover and DRC rate value). This parameter, like other system parameters, is broadcast on a forward link control channel to access terminals operating in a wireless carrier's system. Then, EV-DO specifies that to switch sectors, an access terminal first sends a series of null DRC covers (i.e., DRC requests without a requested data rate—such as a DRC rate) to the RNC for a number of time slots equal to twice the DRC length value. Thus, if the DRC length value is "2", the access terminal would send null DRC requests to the RNC for four consecutive timeslots. The transmission of null DRC requests to the RNC lets the RNC know that it should hold any data destined to the access terminal, so that the data will not be lost as the access terminal switches to the new sector.

EV-DO also specifies that an access terminal may from time to time send Route Update Messages to an access network (e.g. to the RNC, for example). To generate a Route Update Message, the access terminal measures pilot strength signal from one or more available RNCs, and inserts the available data rates into the Route Update Message. When an access terminal is in idle mode (i.e. not engaged in a communication session), Route Update Messages may be sent in various scenarios. For example, Route update messages may be prompted by a Route Update request from the access network, may be sent when the access terminal has moved more than a predetermined distance since the last Route Update Message, or may be sent when the access terminal sends a registration message on the access channel (such as a UATI request or a connection request, for instance). A Route Update Message can also be sent by an access terminal during a communication session. For example, the access terminal may send a Route Update Message whenever the strength of a pilot signal changes a predetermined level, or in response to a request from the RNC. It should be understood that in 1xRTT, Pilot Strength Measurement Messages (PSMMs) may be used in a similar manner as Route Update Messages in EV-DO. Further, when other protocols are used, similar functionality may be provided by other types of messages.

III. Exemplary Method of Controlling Switching

Figure 3:
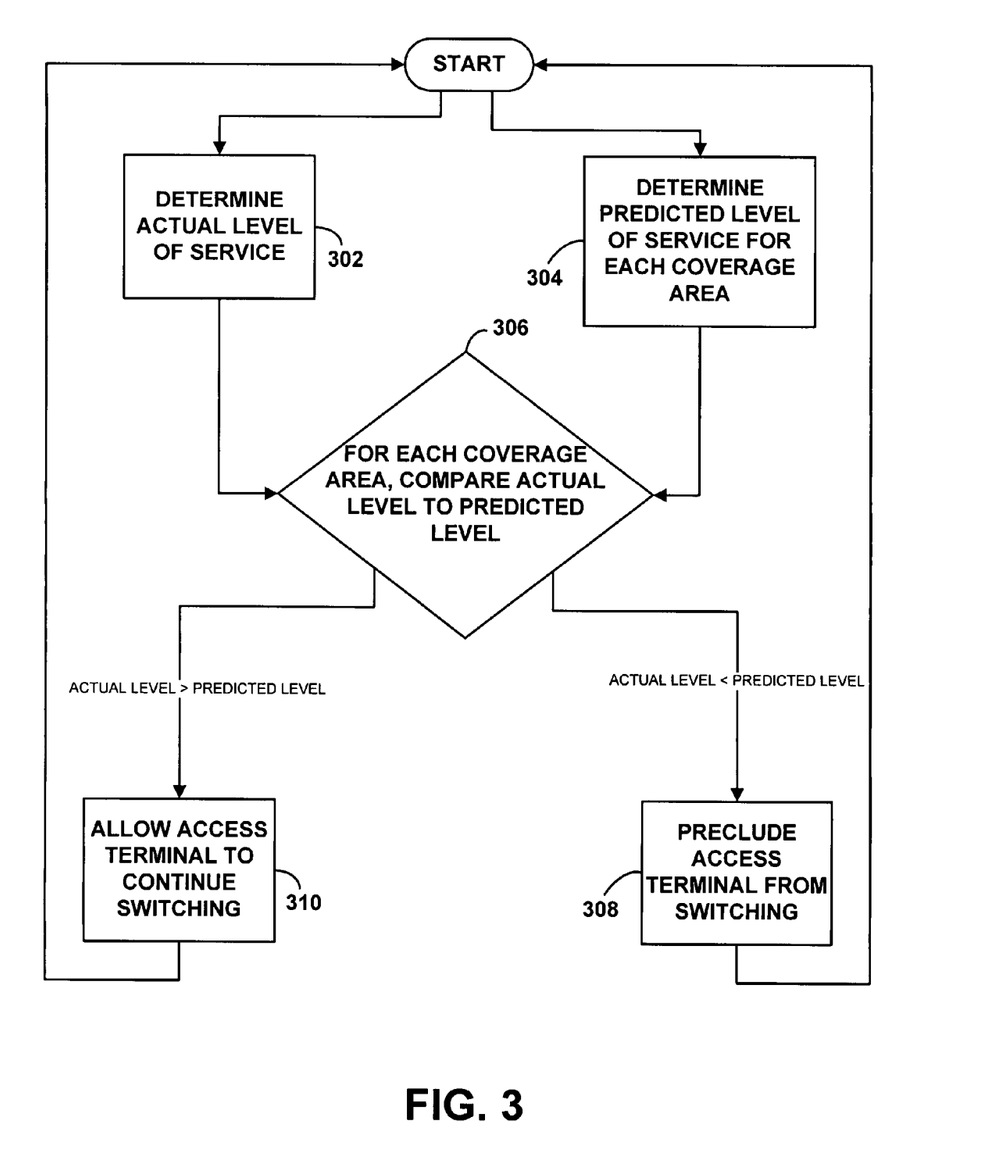
FIG. 3 is a flow chart illustrating an exemplary method of controlling switching of an access terminal between wireless coverage areas in a wireless communication system.

FIG. 3 is a flow chart depicting an exemplary method of controlling the switching of an access terminal between wireless coverage areas in a wireless communication system. The method may be carried out by an RNC or any other network entity or combination of network entities involved in providing service to an access terminal. In this disclosure, FIG. 3 is described by way of example with an RNC carrying out the method, but this should not be construed as limiting the scope of the invention.

The method involves an RNC determining an actual level of service provided to an access terminal that has been switching between wireless coverage areas, as shown by block 302. In addition, the method involves the RNC determining, for each of the coverage areas, a predicted level of service that would be provided if the access terminal would operate in only that coverage area, as shown by block 304. After the RNC determines the actual and predicted levels of service, the RNC compares the actual level of service provided to the access terminal and the predicted level of service for each coverage area, as shown by block 306. If the actual level is less than the predicted level for at least one of the coverage areas, then the RNC precludes the access terminal from continuing to switch between the wireless coverage areas, as shown by block 308. If, on the other hand, the actual level of service is greater the predicted levels, then the RNC allows the access terminal to continue switching between coverage areas, as shown by block 310.

Preferably, the method also involves the RNC (or other entity or entities carrying out the method) identifying each access terminal (if any) for which the method should be applied. To identify appropriate access terminals, the RNC may look for access terminals that are substantially stationary and/or that have been experiencing at least a threshold high rate of switching between sectors. The RNC can determine which of its served access terminals are substantially stationary by monitoring the location of its served access terminals. For example, an RNC can periodically determine the location of each of its served access terminals and compare current and past locations for each served access terminal. The RNC may determine the location of an access terminal by querying a mobile location system (possibly via a location studio) and/or by querying the access terminal itself. Location determination techniques that can be used by the RNC, mobile location system, and/or the access terminal include the use of GPS, round trip delay, handoff messages, or other locating techniques now known or later developed.

Of the access terminals identified as substantially stationary, the RNC can then determine which access terminals have been experiencing at least the threshold rate of switching between sectors by monitoring DRC requests (and particularly the DRC covers in such requests) that the RNC has been receiving from the access terminals over time. Preferably, the rate at issue for a given access terminal will then be the rate at which the access terminal actually switched between sectors (where the requests to switch have been granted).

For each access terminal (if any) that is identified by the RNC, the RNC can carry out the process of evaluating the access terminal's actual level of service over time and comparing that access level of service with a predicted level of service respectively for each sector between which the access terminal has been switching. (The process is easiest to describe in a scenario that involves just two such sectors. However, the process could apply just as well with any number of sectors—two or more.)

In the preferred embodiment, the "level of service" metric is (or at least includes) the effective throughput or data rate of transmissions to the access terminal. However, it should be understood that any of a variety of other "level of service" metrics could be used instead or in addition. For instance, the RNC could consider metrics such as jitter or voice quality (if the data communications represent voice) or other metrics. Further, it should be understood that the RNC's measurements of level of service may or may not be completely accurate. The RNC may make certain assumptions when taking the measurements or computing throughput values. More important than the accuracy of the measurements is that the measurements are made and that they are compared as noted above. Ideally, assumptions that the RNC makes when determining the access terminal's actual throughput would be made as well when determining the access terminal's predicted throughput and would thus cancel out in the comparison. However, even that ideal may not be achieved in practice.

To determine an access terminal's actual throughput in EV-DO, the RNC may compute the average of the data rates requested by the access terminal over time, which would presumably be the data rates that the RNC granted to the access terminal in the corresponding slots. In doing so, as presently contemplated, the RNC may treat as zero the data rate in each time slot where the access terminal did not send an actual DRC request or in which the access terminal sent a null DRC cover, since the data rate received by the access terminal in the corresponding time slots on the forward link should be zero. The RNC may make this measurement as a rolling average over time, possibly on a sliding window over time.

To determine the access terminal's predicted throughput in each sector, the RNC may compute the average of the data rates requested by the access terminal over time in that sector. Preferably, however, the RNC eliminates from the average those time slots for which the access terminal sent a null DRC rate request. This computation is based on the theory that, if the access terminal would remain in the sector, the access terminal would continue to receive the data rates that the access terminal actually (or at least initially) received in the sector. However, given the fact that at least one actual handoff did in fact occur as the result of some degradation in service in the sector (e.g., interference), the resulting computation for the sector is probably slightly high. Therefore, the RNC may further apply a weighing factor to the predicted throughput, possibly reducing the computed value.

The RNC's computation of the access terminal's actual and predicted throughput over time can disregard the fact that the RNC may have granted some slots to other access terminals instead of to the access terminal at issue. Disregarding that factor is permissible, since the factor should largely cancel out in the comparison of actual throughput to predicted throughput (i.e., the time slots granted to other terminals that are included in the computed actual throughput should approximately equal those included in the computed predicted throughput). In an alternative embodiment, however, time slots that were allocated for transmission to other access terminals could be accounted for in the computations (by assuming throughput is zero, or reducing throughput in those time slots).

The RNC may next compare the computed actual throughput with the computed predicted throughput respectively for each sector, to determine which is greater. It can be more efficient to allow an access terminal to continue switching between sectors if the computed actual throughout is greater than the predicted throughout for each individual sector. Therefore, if the RNC determines that the actual throughput is greater than the predicted throughput in each sector, then the RNC will allow the access terminal to continue switching between the sectors. On the other hand, if the RNC determines that the predicted throughput in either one of the sectors is greater than or equal to the actual throughput, then the RNC will force the access terminal to operate in that sector. Further, if more than one of the sectors have predicted throughput greater than the actual throughput, then the RNC may force the access terminal to operate in the sector having the highest predicted throughput among those sectors. Alternatively, if more than one of the sectors have predicted throughput greater than the actual throughput, and the access terminal is currently operating in one of those sectors, the RNC may lock the access terminal in the sector in which it is currently operating (regardless of whether predicted throughput is even higher in other sectors).

In an alternative embodiment, it may be deemed inefficient to continue to allow switching when actual throughout is greater than the predicted throughput for each sector, but the difference between actual throughput and the predicted throughput for each sector is below a predetermined threshold value. For example, at some predetermined threshold level, the amount of throughput gained by switching sectors (i.e., the difference between actual and predicted throughput) may be outweighed by the demands switching places on network resources. Such a threshold level may be chosen based on engineering design choice.

When it is determined that switching should be discontinued, the RNC can force the access terminal to operate in a particular sector. For example, the RNC can use the "DRC Lock Bit" in the "DRC Lock channel," which is part of the EV-DO "MAC" channel on the forward link, directed to the particular access terminal. The RNC may set a DRC Lock Bit for a particular sector by sending a DRC Lock Bit Message to the access terminal. More specifically, under EV-DO, an RNC can effectively lock an access terminal out of sending a DRC request pointing to a particular sector by setting the DRC Lock Bit for that sector to "0". Upon receipt of the DRC Lock Bit in the DRC Lock Channel for a given sector, an access terminal will not point its DRC requests at that sector (i.e., will not specify that sector in the DRC cover of its DRC requests). To force an access terminal to operate in a given sector among multiple sectors, the RNC may thus lock the access terminal out of operating in each other sector of the multiple sectors, by setting the DRC lock bit to "0" in each such other sector.

An RNC may determine that switching should be allowed in various ways. For example, if the access terminal has not previously been forced to operate in a particular sector, or has not otherwise had normal switching operations altered, no action is required. However, if the access terminal is currently locked in a certain sector, the RNC can remove the lock, to allow switching. To remove the lock in EV-DO, the RNC can setting the DRC Lock Bit to "1" in any sector which had previously been set to "0", to allow switching. More specifically, EV-DO defines an "DRC Lock Period" as a duration of time slots between consecutive DRC lock bit transmissions. (Under one version of EV-DO, this period can be set to 8 or 16 slots, for instance.) Once the RNC provides a "0" DRC Lock bit, the lock status would remain in effect for the duration of the DRC Lock Period. The RNC can then remove the lock by changing the DRC Lock bit to "1" for the sector at issue. Alternatively or additionally, the RNC may unlock an access terminal prior to the expiration of a given DRC Lock Period, if it determines the access terminal should be unlocked.

Further, the access terminal, while locked, may provide Route Update Messages to the RNC. The RNC can use the Route Update Messages to monitor the signal strength available to the access terminal in various sectors. Accordingly, the RNC may determine that locking the access terminal to a particular sector, may no longer be advantageous. When the RNC makes such a determination, the RNC may remove the lock by changing the DRC Lock bit to "1" for the sector at issue.

In accordance with the exemplary embodiment, the RNC will continuously apply the foregoing method, identifying access terminals to which the process should apply, and locking the access terminals out of one or more sectors if the RNC deems that doing so would be better than the alternative as described above. Further, as noted above, this process could be carried out by one or more other network entities other than the RNC, such as a BTS for instance. Other examples and variations are possible as well.

Figure 4A:
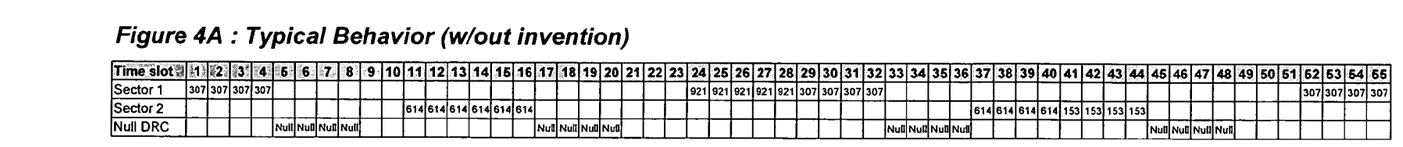
FIG. 4A is a chart tracking a sample communication session to which the exemplary method can be applied.

FIG. 4A is a chart tracking a sample communication session between an RNC and an access terminal, to which the exemplary method can be applied. It should be understood that the data in FIGS. 4A-4C theoretical, and not based on actual test data. The first row in FIG. 4A represents sequential time slots 1-55, during which the access terminal is engaged in a communication session with the RNC. The second and third rows show the data rates included in DRC requests received by sector 1 and sector 2, respectively, at a given time slot. The fourth row shows when the RNC receives a null DRC request from the access terminal (indicating the access terminal wants to switch sectors). For simplicity, null DRC requests for switching from sector 1 to sector 2 and for switching from sector 2 to sector 1 are both shown in this row.

In time slots 1-4 of the communication session, the access terminal requests a data rate of 307 kbps from sector 1. Then, the access terminal indicates it wishes to switch sectors by sending null DRC requests. In this example, DRC length=4, and accordingly, the access terminal sends four consecutive null DRC requests in time slots 5-8. After a delay in time slots 9-10, the access terminal resumes the communication session in time slot 11, in sector 2.

In this example, time slots 9-10 are shown as inactive to account for additional delay that can occur when an access terminal switches between sectors. In many instances, data is not immediately available from the sector to which the access terminal is switching to (in this case sector 2). For example, there is inherently some delay when data is transferred between base stations over a T1 connection (or any type of data connection). To account for such delay in this example, no value is shown in some time slots following null DRC requests. This may be the case even if the access terminal sends a DRC request.

Once data is available from sector 2, the access terminal continues the communication session by requesting a data rate of 614 kbps in time slots 11-16. The access terminal continues to switch between sector 1 and sector 2 during the communication session in time slots 17-55.

To switch between sectors, the access terminal sends null DRC requests in time slots 17-20, 33-36, and 45-48. Further, time slots 21-23 and 49-51 have no value, in order to account for additional delay in switching sectors. As a result, during the tracked time period, the access terminal requests 921 kbps from sector 1 in time slots 24-28, 307 kbps from sector 1 in time slots 29-32, 614 kbps from sector 2 in 37-40, 153 kbps from sector 2 in time slots 41-44, and 307 kbps from sector 1 in time slots 52-55.

With the data in FIG. 4A, actual throughput during a given time period can be computed. In this example, the computation is done after time slot 55, and considers time slots 1-55. Specifically, an actual "burst average" can be computed by averaging the DRC requests received by both sectors (assigning a value of zero to time slots where a null DRC request is received or data is unavailable to the access terminal). Performing this calculation, the actual burst average that was granted during time slots 1-55 is 273.5 kbps.

Predicted throughput in sectors 1 and 2 may also be computed with this information. If the access terminal does not switch between sectors it presumably would have service during those time slots when a null DRC request is sent and/or when no data is available due to switching-associated delay. Therefore, predicted throughput may be calculated as an estimated burst average for each sector (averaging only those time slots where a DRC request was received by a particular sector). Accordingly, for sector 1, time slots 1-4, 24-32, and 52-55 are averaged, resulting in an estimated burst average of 487.6 kbps. Similarly, for sector 2, time slots 11-16 and 37-44 are averaged, resulting in an estimated burst average of 482.3 kbps.

However, it is likely that the access terminal switched sectors because the level of service decreased in the sector in which the access terminal was operating. To account for a decreased level of service in those slots not included in the calculation of predicted throughput (i.e., those where a null request or no request was received), an estimation factor may be applied. The estimation factor may vary, and is a matter of engineering design choice. In this example, a 30% overall decrease in level of service is estimated, and therefore an estimation factor of 0.7 is used. Therefore, the estimated burst average is multiplied by the estimation factor to yield a predicted throughput for each sector. Applying the estimation factor of 0.7, the predicted throughput for sector 1 is 341.3 kbps and the predicted throughput for sector 2 is 337.6 kbps.

Since the access terminal is operating in sector 1, and the predicted throughput in sector 1 is greater than the actual throughput, the access terminal would be locked in sector 1 (e.g., by sending a DRC lock to the access terminal). It should be understood that if the access terminal were in sector 2 and the same results were reached, the access terminal may be locked in sector 2, as the predicted throughput for sector 2 is greater than the actual throughput. Preferably, however, since the predicted throughput for sector 1 is greater than the predicted throughput for sector 2, the access terminal would be instructed to switch to sector 1 and then locked in sector 1.

Preferably, the estimation factor is designed to simulate a near-worst case scenario. For example, a request to change sectors might not indicate that a degradation in service quality. The request to switch may have been made because the level of service in the requested sector increased, while the level of service in the current sector remained the same. Even further, a request might be made when the level of service in the current sector has increased, but the level of service in the requested sector has increased by more. Therefore, a request to switch may not necessarily indicate degradation in level of service.

Figure 4B:
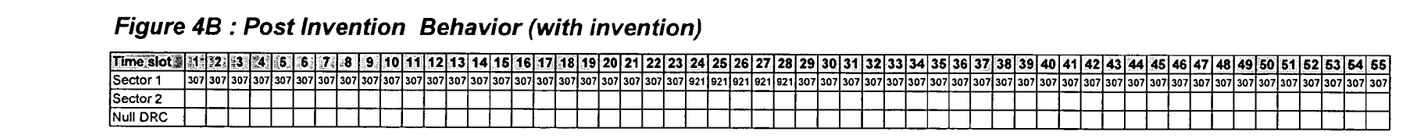
FIG. 4B is also a chart tracking a sample communication session to which the exemplary method can be applied.

FIG. 4B shows how the actual service available may be greater than the predicted throughput for a sector. FIG. 4B charts requested data rates in the same time period as FIG. 4A, but shows what the level of service could have been, had the access terminal been locked at the beginning at time slot 1, rather than being allowed to switch sectors. Using the above-described techniques, the actual burst average (i.e. the actual throughput) can be determined to be 362.8 kbps. Thus, the actual burst average for sector 1 only is better than the predicted burst average for sector 1, as it accounts for the fact service may not be degraded as severely (or even degraded at all) as predicted by the estimation factor. This result is expected, as the estimation factor was designed to help assure an access terminal is not unnecessarily locked to a sector.

Figure 4C:
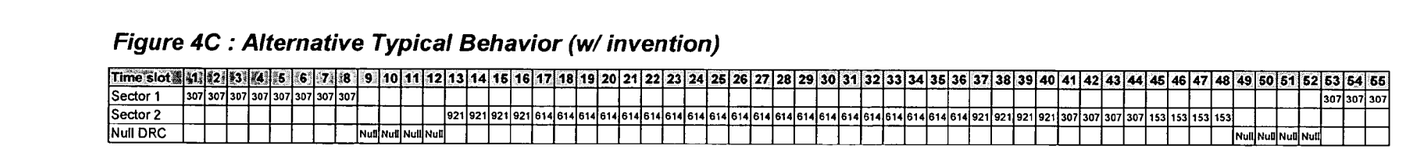
FIG. 4C is also a chart tracking a sample communication session to which the exemplary method can be applied.

FIG. 4C is of the same format as FIGS. 4A and 4B, but shows a scenario where the access terminal would not be unlocked (i.e., where the access terminal would be allowed to continue switching between sectors). FIG. 4C depicts a continuation of the communication session of FIG. 4A, with time slot 56 of FIG. 4C following time slot 55 of FIG. 4A. Therefore, as a result of the determination made in time slot 55, the access terminal is locked to sector 1 in time slot 56.

Since the access terminal is locked, it will not send DRC requests, unless the RNC allows the access terminal to resume switching. While the access terminal is not sending DRC requests, the access terminal continues to send Route Update Messages to the RNC. More specifically, the access terminal continues to monitor available sectors (e.g., by maintaining an active set), and sends a Route Update Message whenever a change in the level of service in a sector is detected. Thus, the Route Update Message provides the RNC an indicator of available level of service in sector 2, so that the RNC can continue computing the predicted throughput in each sector, even when no DRC requests are not received (i.e. while the access terminal is locked to a sector).

For example, in time slot 58, the access terminal may receive a pilot signal from sector 2 indicating that the level of service available in sector 2 is 921 kbps (this is not shown, as the access terminal is still connected to sector 1 in time slot 58). However, because the access terminal is locked to sector 1, the access terminal will not immediately request to switch to sector 2. The access terminal will, however, send a Route Update Message to the RNC in time slot 59, indicating that a change in level of service, to 921 kbps in sector 2, has been detected. The RNC can now assume that the available level of service in sector 2 is 921 kbps, until a contrary indication is received.

At time slot 59, the available throughput in sector 2, at 921 kbps, is considerably higher than the most recently computed actual throughput. Therefore, the RNC may use this information to make a decision that the access terminal should be unlocked, and at time slot 63 set the DRC Lock Bit to "1" for sector 1. It should be understood the number of time slots between the access terminal sending the Route Update Message and the RNC setting the DRC Lock Bit may vary. When unlocked, the access terminal will request to switch to sector 2, by sending DRC null requests in time slots 64-67.

After the access terminal has been unlocked so that it can resume switching, the RNC will again monitor the actual level service and compute the predicted level of service. These calculations are not described in detail here, as they generally follow the same formulas described in reference to FIG. 4A. It should be understood however, that the RNC may monitor actual and predicted levels of service for a predetermined number of time slots before deciding whether or not to again lock the access terminal. The number of time slots to wait may be an engineering design choice, and in particular, may be selected to help improve the accuracy of predicted throughput calculations. The result of these computations is that the access terminal is locked to sector 2 until time slot 103, when the level of service has fallen in sector 2, so that the actual throughput is lower than the predicted throughput. At time slot 103, the access terminal is again unlocked and allowed to continue switching.

IV. Exemplary System Operable to Control Switching

Figure 5:
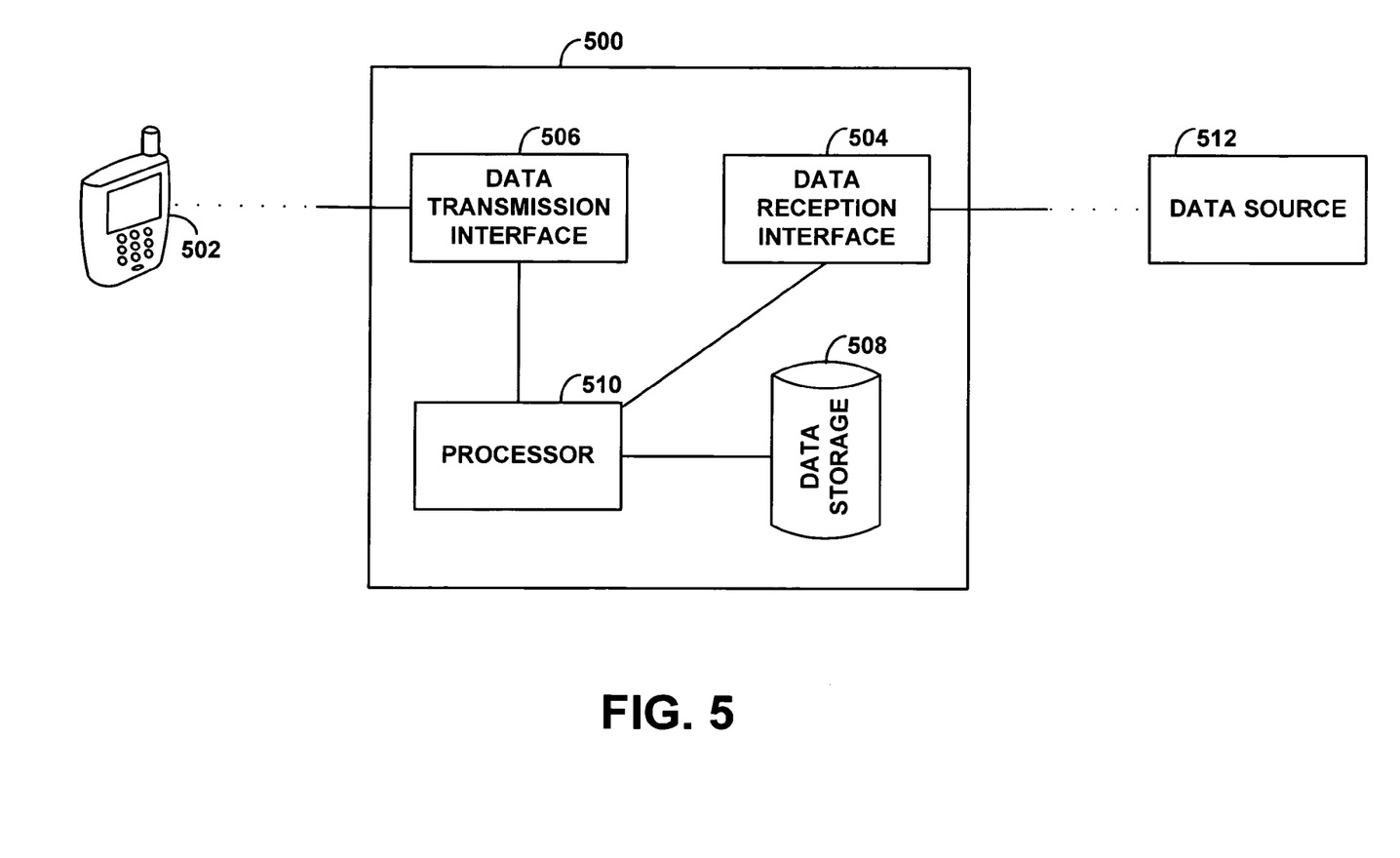
FIG. 5 is a simplified block diagram depicting an exemplary system that is operable in a radio access network to control switching of an access terminal between wireless coverage areas in a wireless communication system.

FIG. 5 is a block diagram depicting an exemplary system that is operable to control switching of an access terminal between wireless coverage areas in a wireless communication system, the machine comprising. In particular, the system may be implemented as part of a radio access network. The system may take the form of an RNC 500 or another network entity (or combination of entities) involved in providing service to an access terminal 502. FIG. 5 is described by way of example with system being an RNC, but this should not be construed to limit the scope of the invention. RNC 500 includes a data reception interface 504, a data transmission interface 506, data storage 508, and a processor 510. Each of data reception interface 504, data transmission interface 506, and data storage 508 are communicatively coupled to processor 510.

Data reception interface 504 operates to receive data from a data source 512. This data may take the form of packet-data received from a packet-data network such as the Internet, or may take another form. Accordingly, data source 512 may also take various forms. For example, data source 512 may be a mobile location system that is operable to provide the location of access terminal 502. Further, data reception interface may operate to receive other data which may be passed on via data transmission interface 506 to access terminal 502, may be used compute an actual or predicted level of service for access terminal 502, or may be used to compare the actual level of service to the predicted level of service for access terminal 502. Other examples are also possible.

Data transmission interface 506 functions to communicate with access terminal 502 (e.g., transmit data to, and receive data from, access terminal 502). Communications can occur between RNC 500 and access terminal 502 via the path including data transmission interface 506 and one or more BTS (not shown). In an alternative embodiment, where system 500 takes the form of a BTS, communication with access terminal 502 may occur directly via an air interface (not shown).

RNC 500 also includes a processor 510 that operates to execute program logic stored in data storage 508. In particular, processor 510 functions to execute comparison logic for comparing (i) an actual level of service provided to access terminal 512 over time, while the access terminal has been switching between the wireless coverage areas, and (ii) for each coverage area in which access terminal 512 has recently operated, a predicted level of service. The predicted level of service for a coverage area is the level of service that would be provided to the access terminal if the access terminal would operate in only that wireless coverage area.

Processor 510 also functions to execute preclusion logic, which precludes the access terminal from switching between wireless coverage areas. The preclusion logic provides that access terminal 502 should be precluded from switching if the actual level of service for the access terminal 502 is less than at least one of the predicted levels of service for access terminal 502.

V. Conclusion

Example embodiments of the present invention have been described above. Those skilled in the art will understand, however, that changes and modifications may be made to these embodiments without departing from the true scope and spirit of the invention, which is defined by the claims.

We claim:

1. A method of controlling switching of an access terminal between wireless coverage areas in a wireless communication system, the method comprising:

making a comparison of (i) an actual level of service provided to the access terminal over time while the access terminal has been switching between the wireless coverage areas, and (ii) for each of the wireless coverage areas, a predicted level of service that would be provided to the access terminal if the access terminal would operate in only that wireless coverage area;

if the comparison indicates that the actual level of service is greater than each predicted level of service, then allowing the access terminal to continue switching between the wireless coverage areas; and if the comparison indicates that the actual level of service is less than at least one of the predicted levels of service, then precluding the access terminal from continuing to switch between the wireless coverage areas.

2. A method of controlling switching of an access terminal between wireless coverage areas in a wireless communication system, the method comprising:

determining that the access terminal has been experiencing at least a threshold high rate of switching between the wireless coverage areas;

responsively computing (i) an actual level of service provided to the access terminal over time, and (ii) for each of the wireless coverage areas, a predicted level of service that would be provided to the access terminal if the access terminal would operate in only that wireless coverage area;

performing a comparison of the computed actual level of service with each of the computed predicted levels of service;

if the comparison shows that the computed actual level of service is greater than each of the computed predicted levels of service, then allowing the access terminal to continue switching between the wireless coverage areas; and if the comparison shows that at least one of the computed predicted levels of service is greater than the computed actual level of service, then precluding the access terminal from continued switching between the wireless coverage areas.

3. The method of claim 2, wherein the wireless communication system engages in time-division-multiplex transmission.

4. The method of claim 2, wherein the wireless communication system comprises an data communication system providing data service under the EV-DO protocol.

5. The method of claim 2, wherein, computing the actual level of service provided to the access terminal over time comprises computing as the actual level of service a measure of actual throughput provided to the access terminal over time in a combination of the wireless coverage areas; and wherein, computing the predicted level of service provided to the access terminal over time in each wireless coverage area comprises predicting as the predicted level of service a measure of throughput likely to be provided to the access terminal in the wireless coverage area.

6. The method of claim 5, wherein computing the measure of actual throughput provided to the access terminal over time in a combination of the wireless coverage areas comprises:

averaging data rates of transmission of bearer data to the access terminal in the wireless coverage areas, wherein, for purposes of averaging the data rates, a data rate of zero is applied for each time slot in which no bearer data was transmitted to the access terminal.

7. The method of claim 5, wherein computing the measure of actual throughput provided to the access terminal over time in a combination of the wireless coverage areas comprises:

averaging requested data rates of transmission of bearer data to the access terminal in the wireless coverage areas, wherein, for purposes of averaging the requested data rates, a data rate of zero is applied for each time slot for which no transmission data rate was requested by the access terminal.

8. The method of claim 5, wherein predicting the measure of throughput likely to be provided in the wireless coverage area comprises:

averaging data rates of transmission of bearer data to the access terminal in the wireless coverage area over time slots in which bearer data was transmitted to the access terminal.

9. The method of claim 8, wherein predicting the measure of throughput likely to be provided in the wireless coverage area further comprises:

applying a weighing factor to the resulting average.

10. The method of claim 5, wherein predicting the measure of throughput likely to be provided in the wireless coverage area comprises:

averaging data rates of transmission of bearer data requested by the access terminal in the wireless coverage area over time slots in which the access terminal requested bearer data transmission.

11. The method of claim 10, wherein predicting the measure of throughput likely to be provided in the wireless coverage area further comprises:

applying a weighing factor to the resulting average.

12. The method of claim 2, wherein allowing the access terminal to continue switching between the wireless coverage areas comprises:

for each of the wireless coverage areas, transmitting to the access terminal a control bit that indicates permission for the access terminal to request data transmission in the wireless coverage area, thereby allowing the access terminal to continue switching between the wireless coverage areas.

13. The method of claim 2, wherein precluding the access terminal from continued switching between the wireless coverage areas comprises:

restricting the access terminal to operate in just a given one of the wireless coverage areas.

14. The method of claim 13, further comprising selecting as the given wireless coverage area a wireless coverage area in which the computed predicted level of service was greater than the computed actual level of service.

15. The method of claim 13, wherein restricting the access terminal to operate in just a given one of the wireless coverage areas comprises:

for each of the wireless coverage areas other than the given one, transmitting to the access terminal a control bit that indicates the access terminal is not allowed to request data transmission in the wireless coverage area, whereby, if the access terminal then requests data transmission, the access terminal requests the data transmission in the given wireless coverage area.

16. The method of claim 15, wherein the control bit comprises an EV-DO DRC Lock Bit.

17. The method of claim 2, further comprising:
conditioning application of the method on a determination that the access terminal is substantially stationary.

18. A system operable in a radio access network to control switching of an access terminal between wireless coverage areas in a wireless communication system, the machine comprising:
a first interface for receiving data destined to the access terminal;
a second interface for transmitting the data to the access terminal via one or more base transceiver stations;
comparison logic for making a comparison of (i) an actual level of service provided to the access terminal over time while the access terminal has been switching between the wireless coverage areas, and (ii) for each of the wireless coverage areas, a predicted level of service that would be provided to the access terminal if the access terminal would operate in only that wireless coverage area; and
preclusion logic for precluding the access terminal from continuing to switch between the wireless coverage areas if the comparison indicates that the actual level of service is less than at least one of the predicted levels of service.

* * * * *